US012722496B2

(12) United States Patent
Li et al.

(10) Patent No.: US 12,722,496 B2
(45) Date of Patent: Sep. 1, 2026

(54) OUTLET POWER ARCHITECTURE FOR VEHICLE

(71) Applicant: GM Global Technology Operations LLC, Detroit, MI (US)

(72) Inventors: Dongxu Li, Troy, MI (US); Lei Hao, Shelby Township, MI (US); Yilun Luo, Ann Arbor, MI (US); Minh-Khai Nguyen, Troy, MI (US); Samantha Gunter Miller, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/001,688

(22) Filed: Dec. 26, 2024

(65) Prior Publication Data

US 2026/0184175 A1 Jul. 2, 2026

(51) Int. Cl.

| | |
|---|---|
| ***H01M 8/04*** | (2016.01) |
| ***B60L 1/00*** | (2006.01) |
| ***H01M 8/00*** | (2016.01) |
| ***H01M 16/00*** | (2006.01) |
| ***H02M 1/10*** | (2006.01) |
| ***H02M 3/335*** | (2006.01) |
| ***H02M 7/5387*** | (2007.01) |

(52) U.S. Cl.

CPC ........... *B60L 1/006* (2013.01); *H01M 16/003* (2013.01); *H02M 1/10* (2013.01); *H02M 3/33576* (2013.01); *H02M 7/53871* (2013.01); *H01M 2250/20* (2013.01); *H01M 2250/402* (2013.01)

(58) Field of Classification Search

CPC . B60L 1/006; H01M 16/003; H01M 2250/20; H01M 2250/402; H02M 1/10; H02M 3/33576; H02M 7/53871

See application file for complete search history.

(56) References Cited

U.S. PATENT DOCUMENTS

| | | | | |
|---|---|---|---|---|
| 2007/0012492 | A1 | 1/2007 | Deng et al. | |
| 2008/0316774 | A1* | 12/2008 | Ito | B60W 10/26 363/17 |
| 2013/0020993 | A1* | 1/2013 | Taddeo | B60L 53/65 320/109 |
| 2020/0298722 | A1* | 9/2020 | Smolenaers | H02J 7/345 |
| 2024/0253517 | A1* | 8/2024 | Hao | B60L 15/007 |

FOREIGN PATENT DOCUMENTS

| | | | |
|---|---|---|---|
| DE | 102018132895 | A1 | 6/2019 |
| DE | 102019121838 | A1 | 2/2020 |
| DE | 102020210217 | A1 | 8/2021 |
| DE | 102022132523 | A1 | 6/2024 |

* cited by examiner

*Primary Examiner* — Elim Ortiz

(74) *Attorney, Agent, or Firm* — Honigman LLP; Matthew H. Szalach

(57) ABSTRACT

An outlet power architecture for a vehicle includes a power source and a direct current to alternating current (DC-AC) converter coupled to the power source. The DC-AC converter includes a plurality of switches and a first capacitor and a second capacitor operably coupled to the plurality of switches.

20 Claims, 9 Drawing Sheets

OUTLET POWER ARCHITECTURE FOR VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an outlet power architecture for a vehicle.

Vehicles are often equipped for operation with an internal combustion engine (ICE), operation as an electric vehicle (EV), and/or operation as a hybrid vehicle. In some instances, a hybrid vehicle may be configured as a plug-in hybrid vehicle, which provides access to recharge a battery of the hybrid vehicle independent of operation of an engine generator.

Consumers often look to utilize battery power from vehicles to provide power to external devices. Many EVs are equipped with functional capabilities to provide power to external devices through an AC power output and/or a DC high power output. However, there is a need for improved power output availability within hybrid vehicles. In some instances, the efficiency of how power is generated and output by hybrid vehicles needs improvement.

SUMMARY

In some aspects, an outlet power architecture for a vehicle includes a power source and a direct current to alternating current (DC-AC) converter coupled to the power source. The DC-AC converter includes a plurality of switches and a first capacitor and a second capacitor operably coupled to the plurality of switches.

In some examples, the outlet power architecture may include an AC filter operably coupled to the DC-AC converter and the power outlet. Optionally, the outlet power architecture may include a balance circuit operably coupled to each of the first capacitor and the second capacitor of the DC-AC converter. In some instances, the power outlet may include a three-phase architecture. In some configurations, the power source may be an engine generator. In other configurations, the power source may be a fuel cell.

A hybrid vehicle may be equipped with the outlet power architecture.

In other aspects, an outlet power architecture for a vehicle includes an engine generator and an inverter coupled to the engine generator. A converter is coupled to the engine generator via the inverter. The converter includes a plurality of switches and at least one capacitor operably coupled to the plurality of switches. A power outlet is operably coupled to one of the converter and the inverter, and the power outlet is configured to generate a direct current (DC) output from one of the converter and the inverter.

In some examples, the outlet power architecture may include an AC filter, and the converter may include a DC-AC converter. The AC filter may be operably coupled to the DC-AC converter and the power outlet. Optionally, the outlet power architecture may include a balance circuit, and the converter may include a first capacitor and a second capacitor. The balance circuit may be operably coupled to each of the first capacitor and the second capacitor of the converter. In some instances, the converter may be a direct current to alternating current (DC-AC) converter. In other instances, the converter may be a direct current to direct current (DC-DC) converter.

A hybrid vehicle may be equipped with the outlet power architecture.

In further aspects, a method of generating power using an outlet power architecture for a hybrid vehicle includes activating a vehicle to device mode of an outlet power architecture and disconnecting, via the outlet power architecture, a battery of a vehicle from an in-vehicle module. The method also includes determining, via the outlet power architecture, a status of an engine generator, executing, via the outlet power architecture, an inverter based on the status of the engine generator, the inverter including a first configuration and a second configuration, and identifying, via the outlet power architecture, a power load including at least one of an alternating current (AC) load and a direct current (DC) load. The method further includes regulating, based on the identified power load, the engine generator at a load speed and generating, based on the identified power load and the regulated load speed, power.

In some examples, determining an active status of the engine generator may include pre-charging a DC bus and identifying a load speed based on a voltage of the DC bus. Optionally, the first configuration of the inverter may include a passive diode rectifier and the second configuration of the inverter may include active switching of a synchronous rectifier. In some instances, identifying the power load includes identifying the AC load and executing AC power conversion using a phase inverter. In some configurations, the first DC power conversion may include a direct DC output, the second DC power conversion may include a shared DC output, and the third DC power conversion may include a DC to DC (DC-DC) converter. Optionally, the method may include selectively activating switches to define one of the DC load and the AC load at a common outlet.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
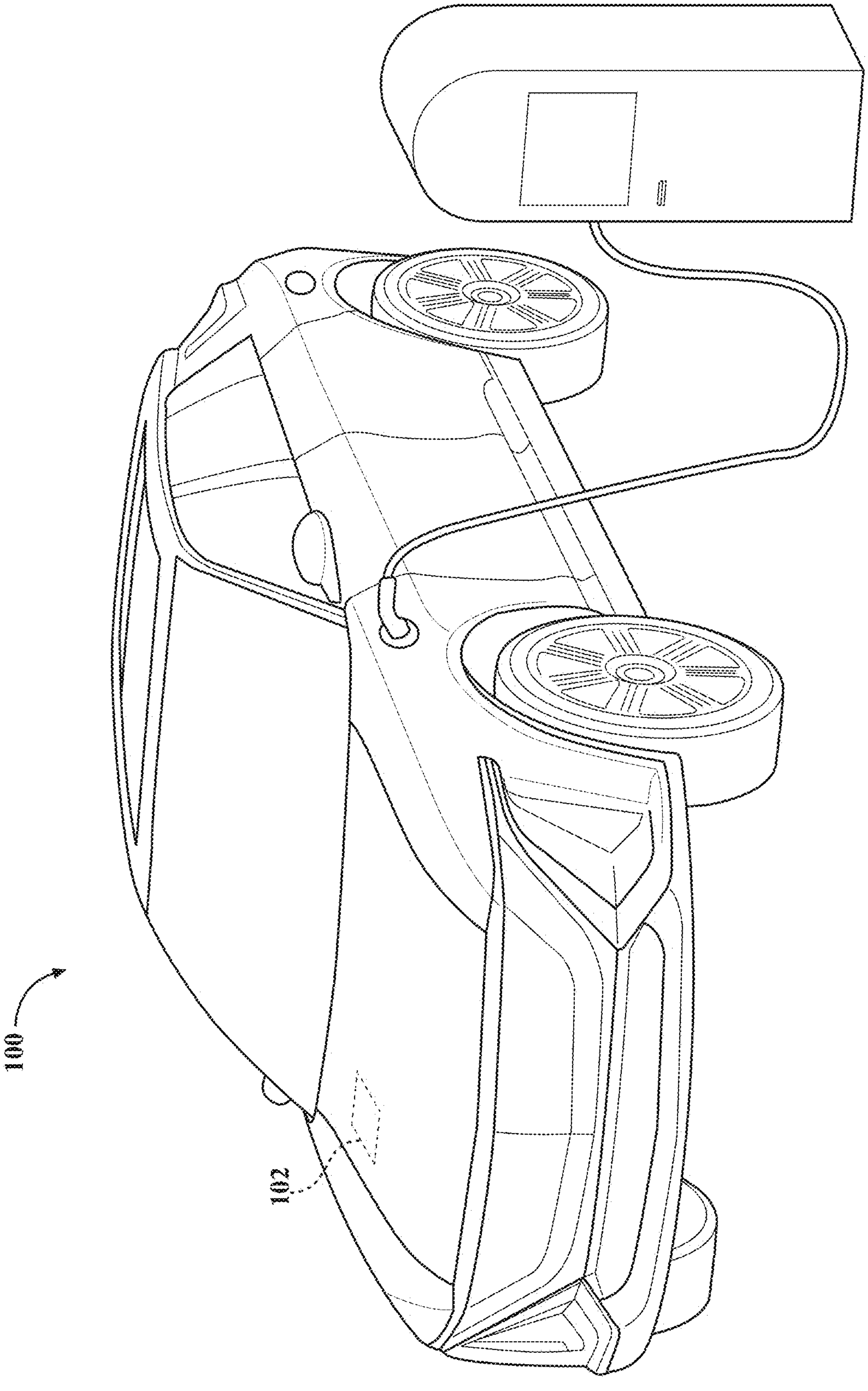
FIG. 1 is a perspective view of a vehicle connected to an electrical power supply.
Figure 2:
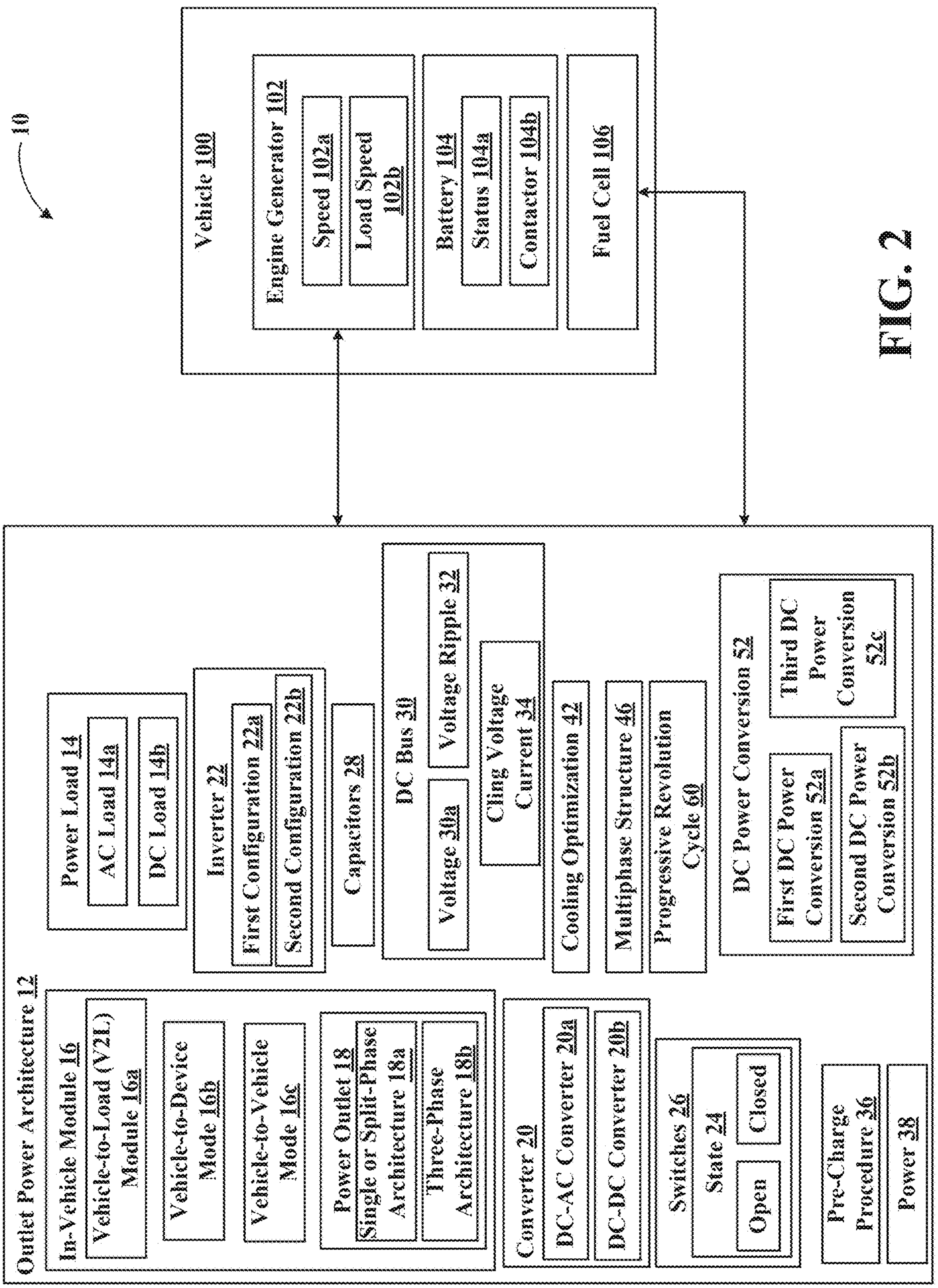
FIG. 2 is an example block diagram of an outlet power system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, an outlet power system 10 for a vehicle 100 includes an outlet power architecture 12 configured to provide a power load 14 from an in-vehicle module 16 including a vehicle-to-load (V2L) module 16*a*. The V2L module 16*a* includes a power outlet 18 configured to provide a user with the power load 14. For example, the outlet power architecture 12 may be configured with a vehicle connection mode 12*a*. The vehicle 100 may be configured a plug-in hybrid electric vehicle 100, referred to herein as a hybrid vehicle. The hybrid vehicle 100 includes an engine generator 102 and battery 104. The hybrid vehicle 100 may also be equipped with at least one fuel cell 106, which may be utilized as part of the outlet power system 10. During operation of the outlet power system 10, the battery 104 is disconnected or otherwise inactive, such that the outlet power architecture 12 is configured to draw the power load 14 from one of the engine generator 102 and the fuel cell 106. For purposes of description, the outlet power architecture 12 may be collectively referred to as a power source 108 of the vehicle 100.

The in-vehicle module 16 may also be referred to as an on-board charger module 16, as the in-vehicle module 16 is configured to provide the power load 14 for use by a user. For example, a user may utilize the in-vehicle module 16 to charge or otherwise provide the power load 14 to an external device. For example, the in-vehicle module 16 may be configured with a vehicle-to-device mode 16*b* as part of the outlet power architecture 12. In some instances, the in-vehicle module 16 may also be configured with a vehicle-to-vehicle mode 16*c*. The power load 14 may include an alternating current (AC) load 14*a* and/or a direct current (DC) load 14*b*. The power load 14 is drawn from the power source 108, which is coupled to a converter 20 via an inverter 22. For example, the converter 20 may be configured as a DC-AC converter 20*a* and/or a DC-DC converter 20*b*. In some instances, the converter 20 may be utilized to convert both the AC load 14*a* and the DC load 14*b*. The DC-DC converter 20*b* may be an optional addition to the outlet power system 10 and may be utilized to provide the power load 14 for vehicle-to-vehicle auxiliary power functions. The outlet power architecture 12 is configured to selectively switch between operating conditions (i.e., generating the AC load 14*a* vs. the DC load 14*b*).

The DC-AC converter 20*a* may be utilized to provide either the AC load 14*a* or the DC load 14*b* depending on a state 24 of switches 26 at the power outlet 18. For example, if the switches 26 are all in an open state 24*a*, then the power load 14 is the AC load 14*a*. If some of the switches 26 are in a closed state 24*b*, then the power load 14 is the DC load 14*b*, described in more detail below. The DC-DC converter 20*b* may be utilized to assist in providing the DC load 14*b*. For example, a voltage ripple 32 and/or a cling voltage current 34 may occur as a result of the DC load 14*b*. The DC load 14*b* may also be referred to as DC power takeoff. To mitigate the voltage ripple 32 and/or the cling voltage current 34 that may result from the DC power takeoff 14*b*, the outlet power architecture 12 may utilize the DC-DC converter 20*b*.

The converter 20 also includes at least one capacitor 28 coupled to the switches 26. The converter 20 is coupled to the inverter 22 via a DC bus 30, which translates the power load 14 from the power source 108 to the converter 20. The DC bus 30 may have variable sizing to optimize different operating modes. In some instances, the DC bus 30 may undergo a pre-charge procedure 36 configured through the DC-AC converter 20*a*. The pre-charge procedure 36 may assist in reducing losses associated with the power load 14 due to the voltage ripple 32 and/or the cling voltage current 34. The pre-charge procedure 36 generally improves the overall efficiency and life of the outlet power system 10 when generating the DC load 14*b* through the DC-AC converter 20*a*.

The inverter 22 may have a first configuration 22*a* and a second configuration 22*b*. The first configuration 22*a* of the inverter 22 may include a passive diode rectifier, and the second configuration 22*b* of the inverter 22 may include an active switching of a synchronous rectifier. The split-phase inverter 22 may provide a split for two distinct power loads 14 as compared with the single-phase inverter 22. The outlet power architecture 12 may be configured with cooling optimization 42 to improve the effective life of the inverter 22. Further, sintering may be used when manufacturing the inverter 22 to further extend the effective life of the inverter 22.

Figure 7:
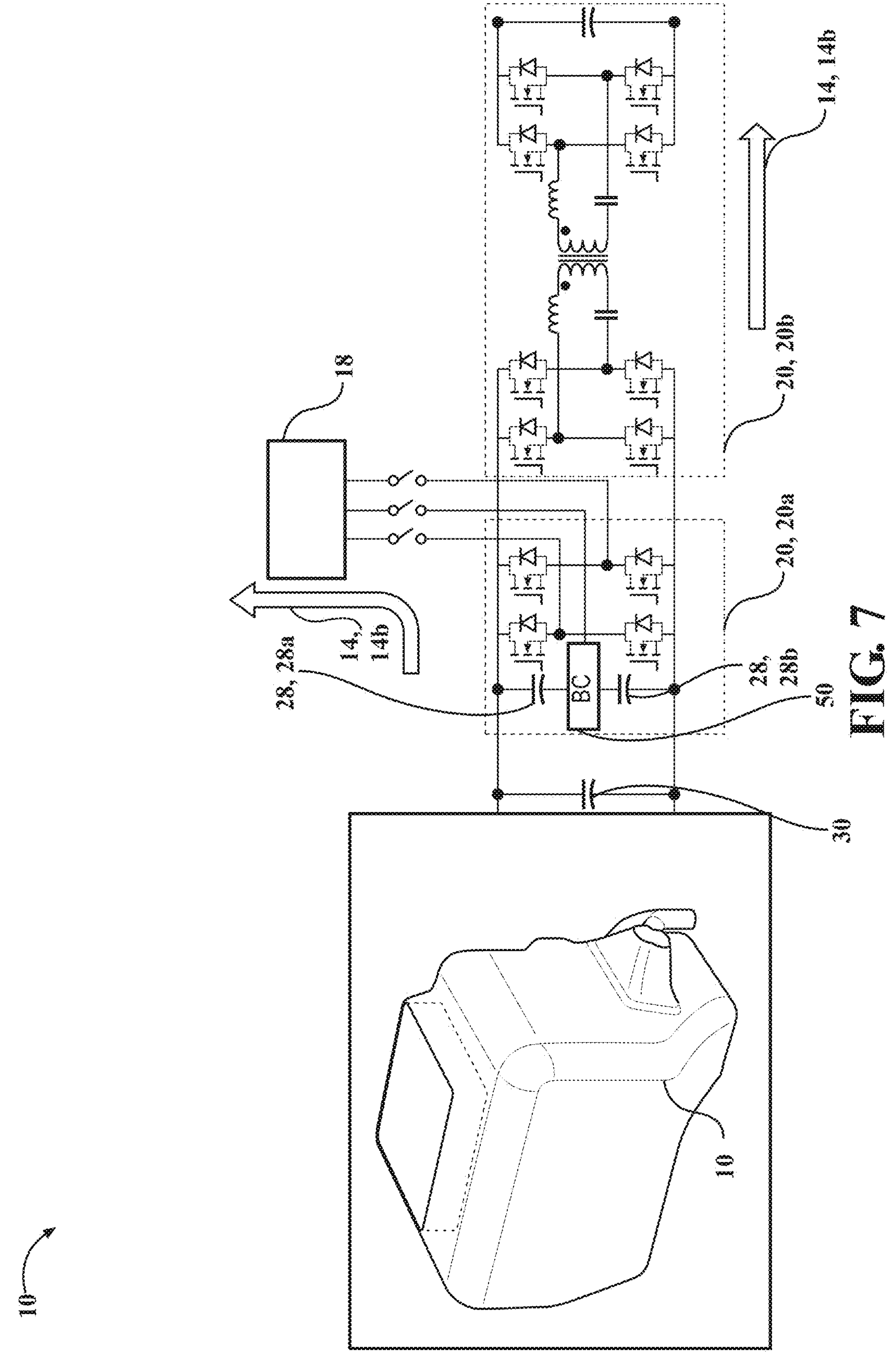
FIG. 7 is yet another schematic diagram of an outlet power architecture according to present disclosure, the outlet power architecture including a fuel cell.
Figure 8:
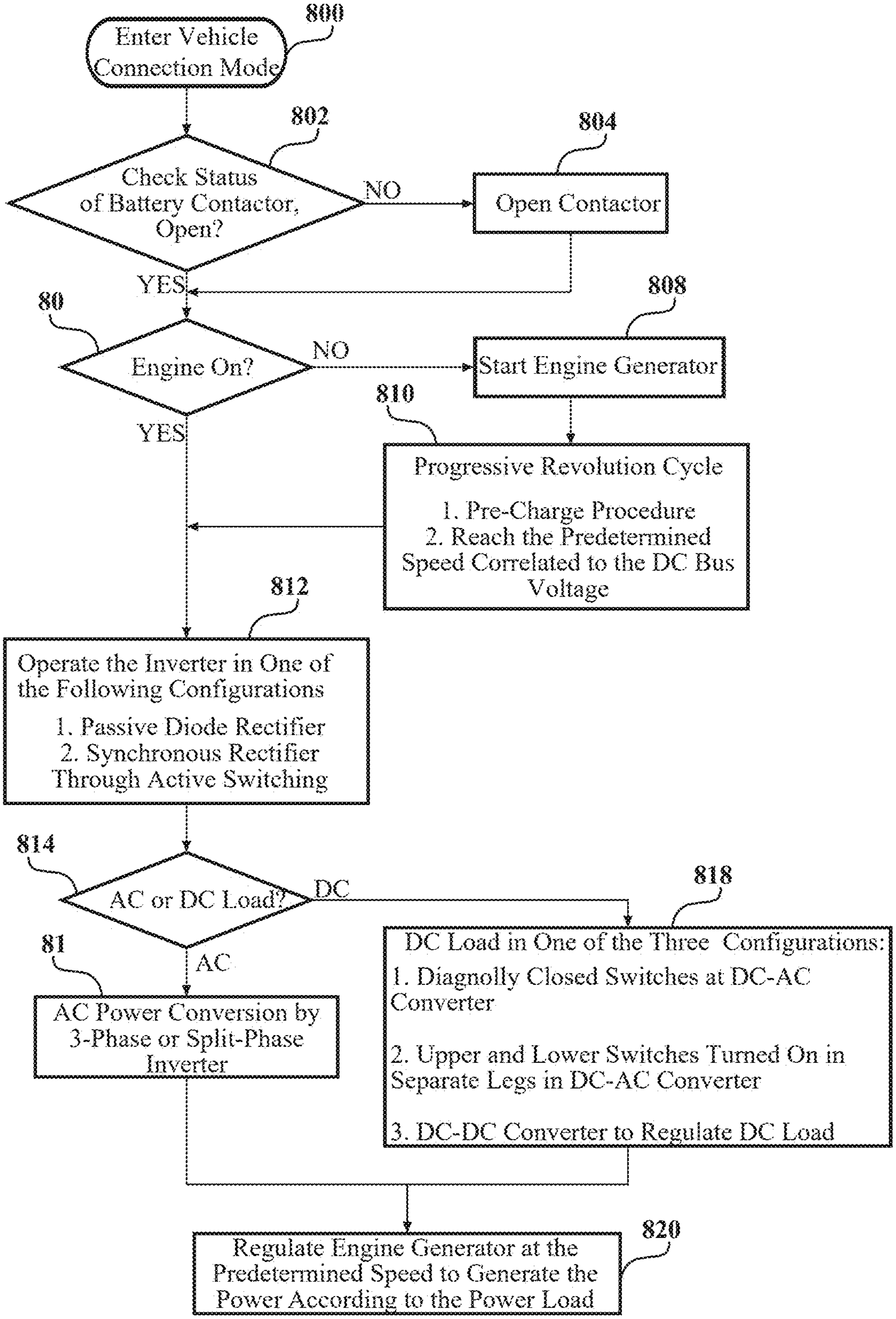
FIG. 8 is an exemplary flow diagram for a method of executing an outlet power architecture according to the present disclosure.

The power source 108 and the inverter 22 may be collectively referred to as a genset 40. The genset 40 is generally free from isolation hardware, as the genset 40 may directly provide the power load 14 to the converter 20 via the DC bus 30. As mentioned above, the outlet power architecture 12 may also be utilized with a fuel cell 106 as the power source 108. For example, FIG. 7 illustrates the genset 40 as including the fuel cell 106 as the power source 108 coupled to the DC bus 30 and the converter 20.

With reference to FIGS. 2-5, the outlet power architecture 12 may also include an AC filter 44 at the DC-AC converter 20*a*. The AC filter 44 is operably coupled to the DC-AC converter 20*a* and the power outlet 18. For example, the AC filter 44 is coupled to the power outlet 18 at the switches 26. The outlet power architecture 12 may have a multiphase structure 46, such that the AC filter 44 may be utilized to moderate the AC load 14*a* provided to the power outlet 18. In some instances, the AC filter 44 may be neutralized when the DC-AC converter 20*a* is utilized to generate the DC load 14*b*. The outlet power architecture 12 may also include a balance circuit 50 that may be coupled to the capacitors 28 of the converter 20. The balance circuit 50 may be positioned between a first capacitor 28*a* and a second capacitor 28*b* (FIG. 6) to balance a voltage of the first capacitor 28*a* and the second capacitor 28*b*.

Figure 3:
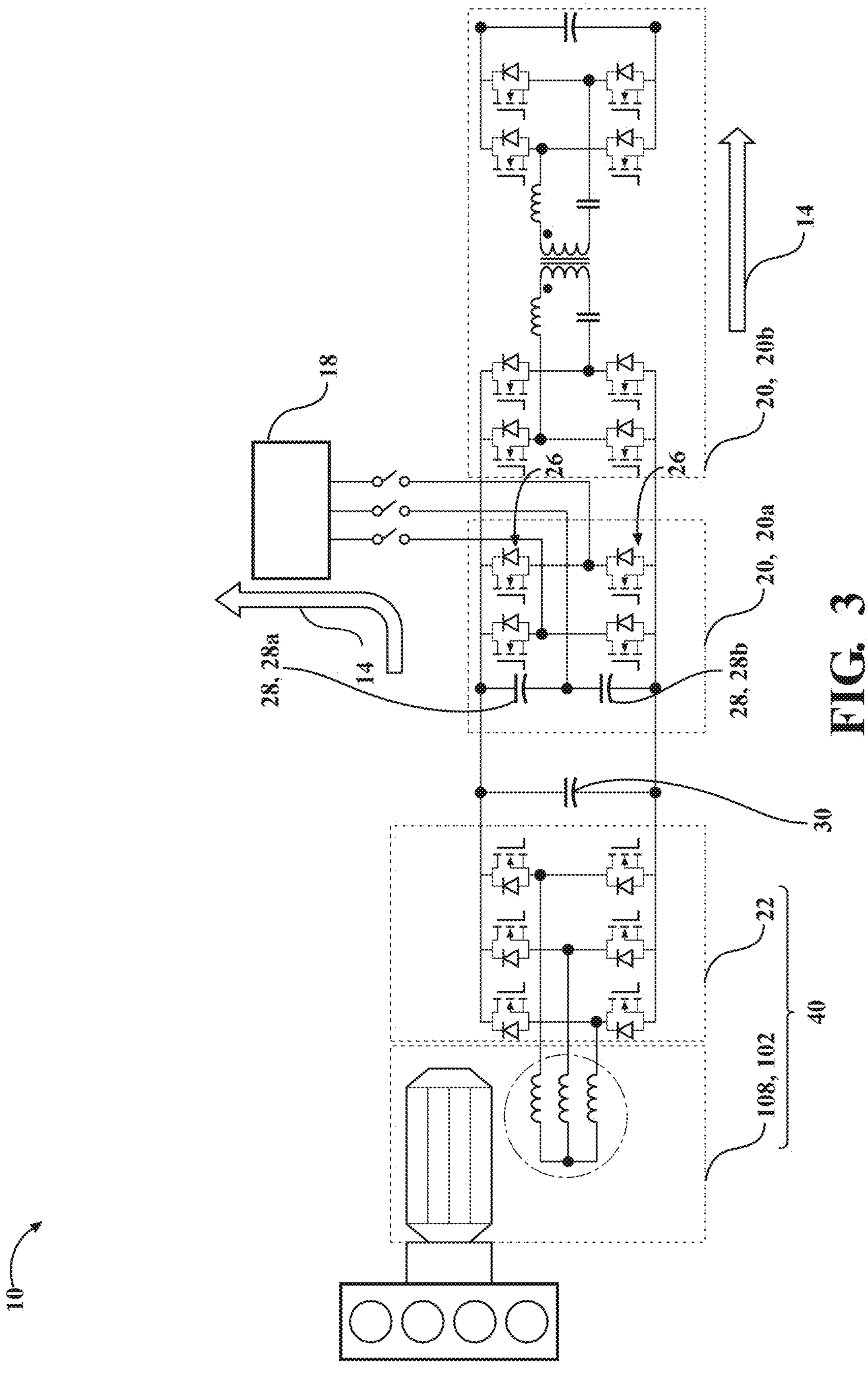
FIG. 3 is a schematic diagram of an outlet power architecture according to the present disclosure.

The outlet power architecture 12 illustrated in FIG. 3 depicts a genset 40 operably coupled to the DC-AC converter 20*a* with an optional DC-DC converter 20*b*. The converter 20 provides the power load 14 to the power outlet 18 via the switches 26. The outlet power architecture 12 is illustrated in FIG. 3 as providing the AC load 14*a* to the power outlet 18, which is represented by the open state of the switches 26. The power outlet 18 is configured with a single or split-phase architecture 18*a*. In the event that the DC-DC converter 20*b* were to be used, the split-phase inverter 22 may be utilized. If the DC load 14*b* is generated, the outlet power architecture 12 may utilize various DC power conversions 52 to include the direct DC output without additional DC conversion based on the DC load 14*b* available from the inverter 22. For example, the outlet power architecture 12 may execute one of a first DC power conversion 52*a*, a second DC power conversion 52*b*, and a third DC power conversion 52*c*. The first DC power conversion 52*a* includes a direct DC output (i.e., the DC load 14*b*). The second DC power conversion 52*b* includes a shared DC output (i.e., the DC load 14*b* using the upper and lower switches 26, described above). The third DC power conversion 52*c* includes utilizing the DC-DC converter 20*b*.

Figure 4:
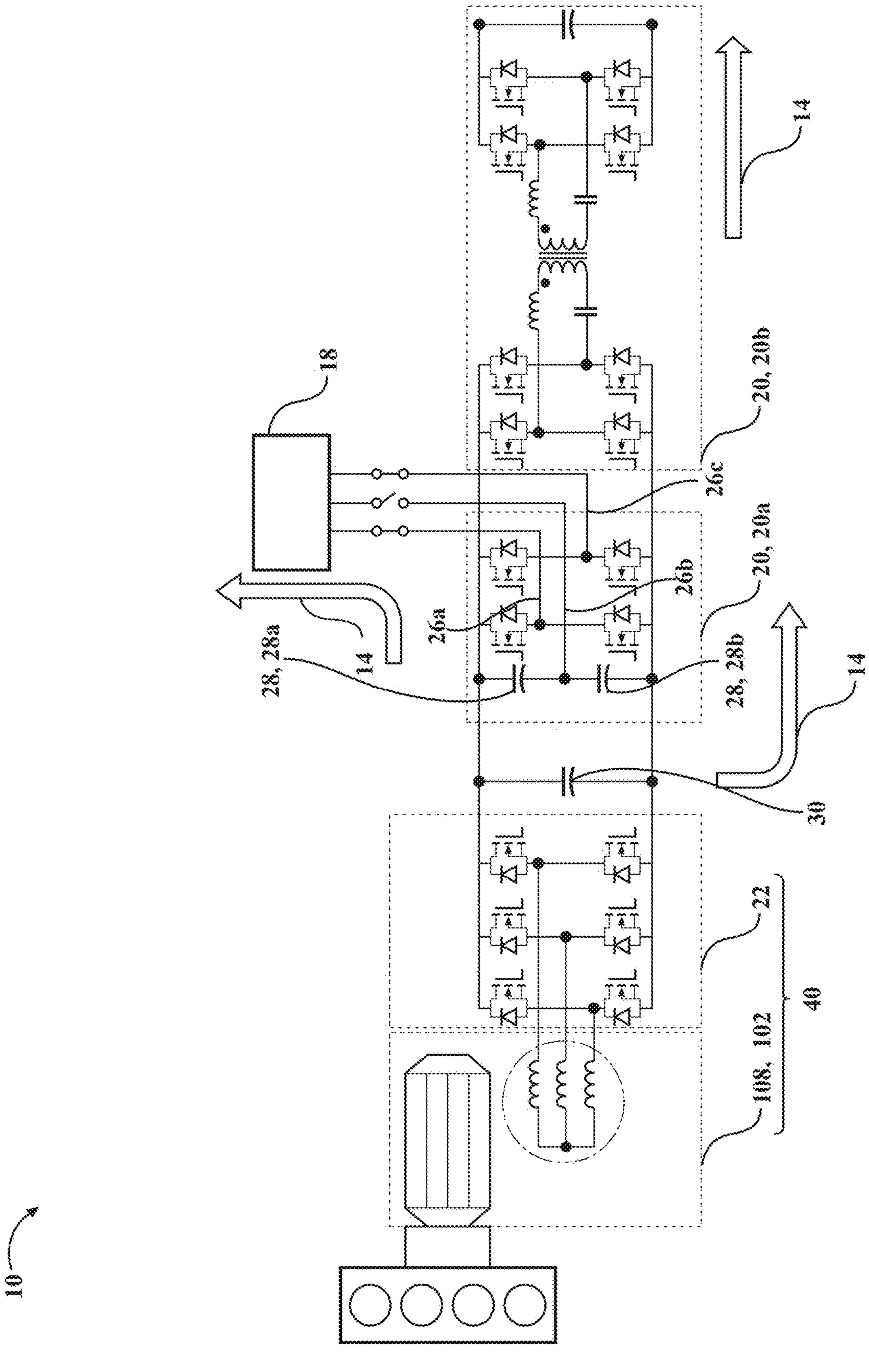
FIG. 4 is another schematic diagram of an outlet power architecture according to the present disclosure.

As depicted in FIG. 4, the same outlet power architecture 12 used in FIG. 3 may be utilized to generate the DC load 14*b* with or without utilizing the DC-DC converter 20*b*. For example, FIG. 4 illustrates a first switch 26*a* and a second switch 26*b* being in a closed state as compared to a third switch 26*c* being in an open state. The first switch 26*a* and the second switch 26*b* are generally diagonal from one another, such that the remaining switch 26*c* is connected to the DC bus 30 via the capacitors 28. As a result, the power outlet 18 may provide the DC load 14*b*. In this configuration, the DC-AC converter 20*a* in a single or split phase configuration is essentially inactive, aside from the power load 14 passing through the closed switches 26*a*, 26*b*.

Figure 5:
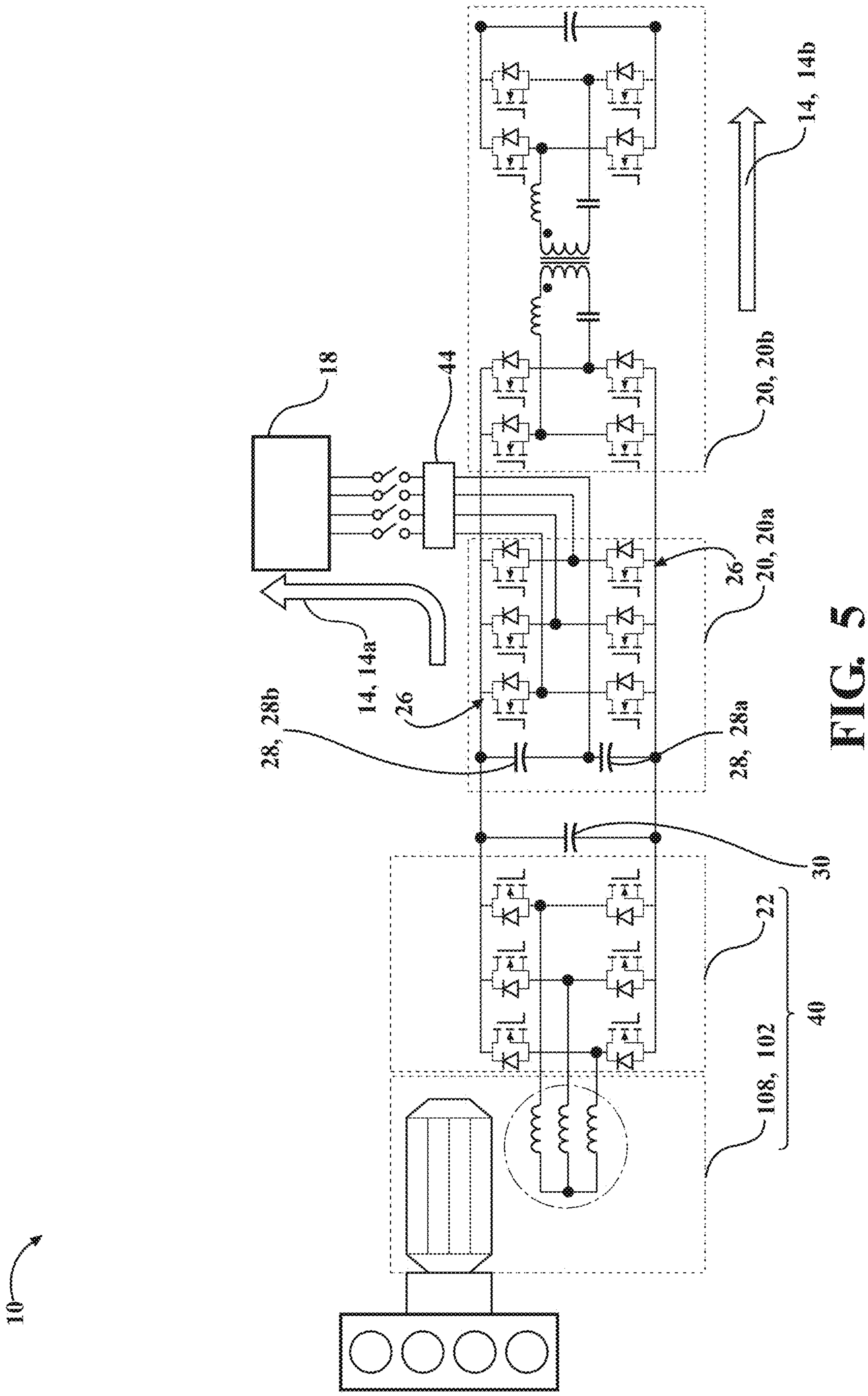
FIG. 5 is a further schematic diagram of an outlet power architecture according to the present disclosure.

With reference to FIG. 5, the outlet power architecture 12 is illustrated with the power outlet 18 having a three-phase architecture 18*b*. The three-phase architecture 18*b* operates similarly to the single or split-phase architecture 18*a*, except that there are more potential variations for utilizing the outlet power architecture 12 to generate the DC load 14*b*. For example, one of an upper switch 26 and one of a lower switch 26 may be closed to define a path for the DC load 14*b* to be provided to the power outlet 18. For providing the AC load 14*a*, the outlet power architecture 12 generally operates in a similar manner described above, regardless of the single or split-phase architecture 18*a* or the three-phase architecture 18*b*.

Figure 6:
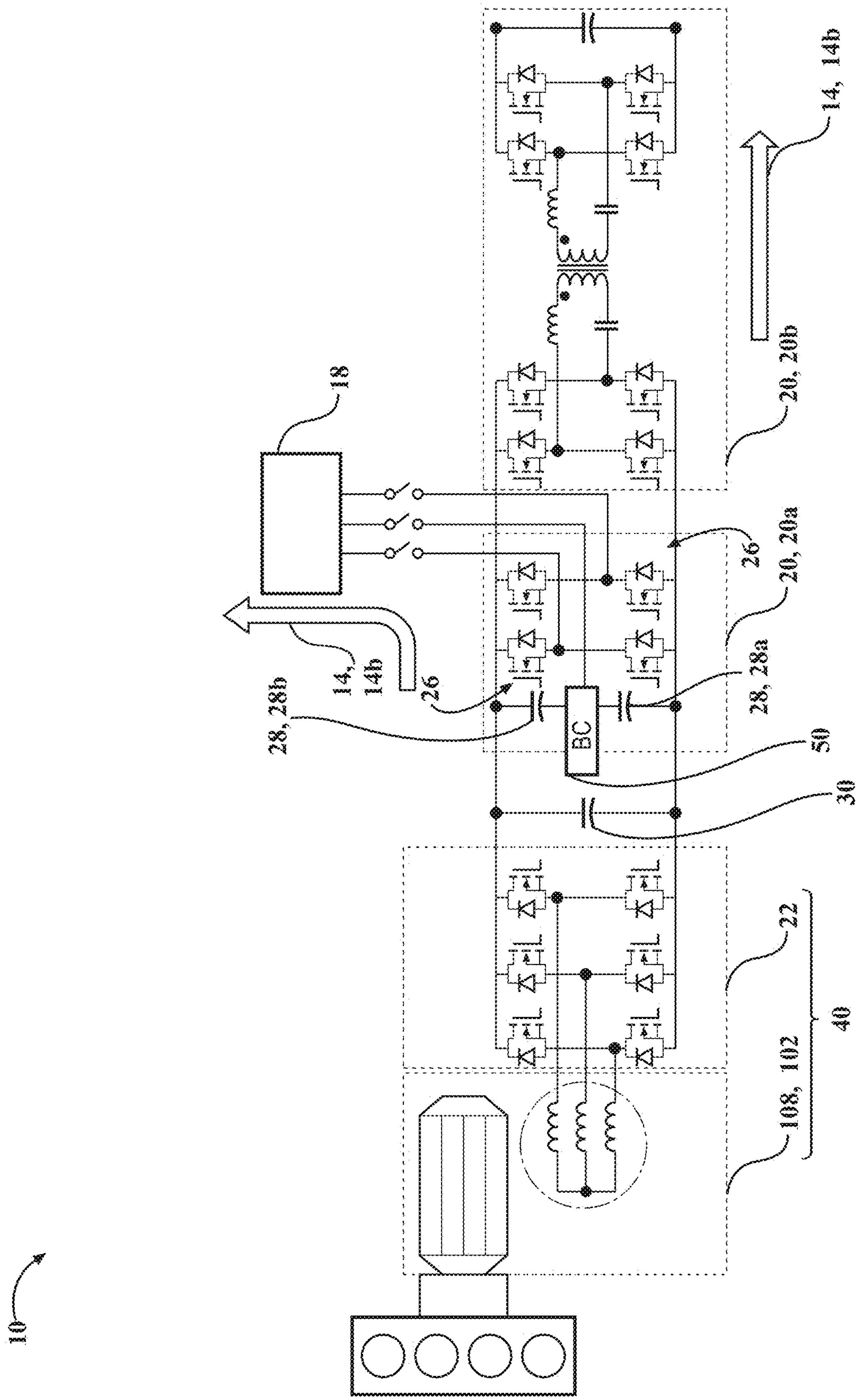
FIG. 6 is another schematic diagram of an outlet power architecture according to the present disclosure, the outlet power architecture including a balance circuit.

Referring now to FIG. 6, the outlet power architecture 12 is illustrated with the balance circuit 50. The balance circuit 50 is configured to resolve potential imbalances of the power load 14. An imbalance may occur based on an external device that is connected to the power outlet 18. For example, the power load 14 requested by the external device at the power outlet 18 may cause an imbalance between the two capacitors 28 in the DC-AC converter 20*a*. The balance circuit 50 may thus be added between the first capacitor 28*a* and the second capacitor 28*b* to balance the power load 14 (i.e., voltage) of the capacitors 28 based on characteristics of the power load 14.

With reference to FIGS. 2-8, an exemplary flow diagram for operating the outlet power system 10 is illustrated. At 800, the outlet power system 10 enters a vehicle connection mode 12*a* of the outlet power architecture 12, and the outlet power architecture 12 checks, at 802, a status 104*a* of a contactor 104*b* of the battery 104. The outlet power architecture 12 is operable when the status 104*a* of the battery 104 is a disconnected status meaning that the battery 104 is not being used by the outlet power system 10 to generate the power load 14. For example, if the contactor 104*b* of the battery 104 is closed, then the outlet power system 10 will open, at 804, the contactor 104*b*. If the battery 104 is disconnected (i.e., the contactor 104*b* is open), then the outlet power architecture 12 verifies whether the power source 108 is turned on or active. For example, the power source 108 may be the engine generator 102, such that the outlet power architecture 12 verifies, at 806, whether the engine is active (i.e., turned on).

If the engine generator 102 is inactive (i.e., turned off), then the outlet power system 10 activates, at 808, the engine generator 102. For example, the outlet power system 10 uses, at 810, a progressive revolution cycle 60 to increase a speed 102*a* of the engine generator 102. The outlet power architecture 12 may also execute the pre-charge procedure 36 for the DC bus 30 until the speed 102*a* of the engine generator 102 reaches a load speed 102*b* that correlates with the power load 14 (i.e., voltage) at the DC bus 30. Once the engine generator 102 is activated, the outlet power architecture 12 operates, at 812, the inverter 22 using one of the first configuration 22*a* (i.e., the passive diode rectifier) and the second configuration 22*b* (i.e., synchronous rectifier).

The outlet power architecture 12 then determines, at 814, whether the power load 14 is to be the AC load 14*a* or the DC load 14*b*. If the power load 14 is the AC load 14*a*, then the outlet power architecture 12 executes, at 816, AC power conversion using the DC-AC converter 20*a*. If the power load 14 is the DC load 14*b*, then the outlet power architecture 12, at 818, utilizes one of three different configurations, each described in detail above. For example, the outlet power architecture 12 may utilize the DC-AC converter 20*a* to pass through the DC load 14*b* by closing two diagonally opposing switches 26. Optionally, one of upper switches 26 and one of lower switches 26 may be closed within separate legs of the DC-AC converter 20*a*. In other instances, the outlet power architecture 12 may utilize the DC-DC converter 20*b* to regulate the DC load 14*b*. Regardless of whether the power load 14 is the AC load 14*a* or the DC load 14*b*, the outlet power architecture 12 regulates, at 820, the engine generator 102 at the load speed 102*b* to generate power 38 according to the power load 14.

Figure 9:
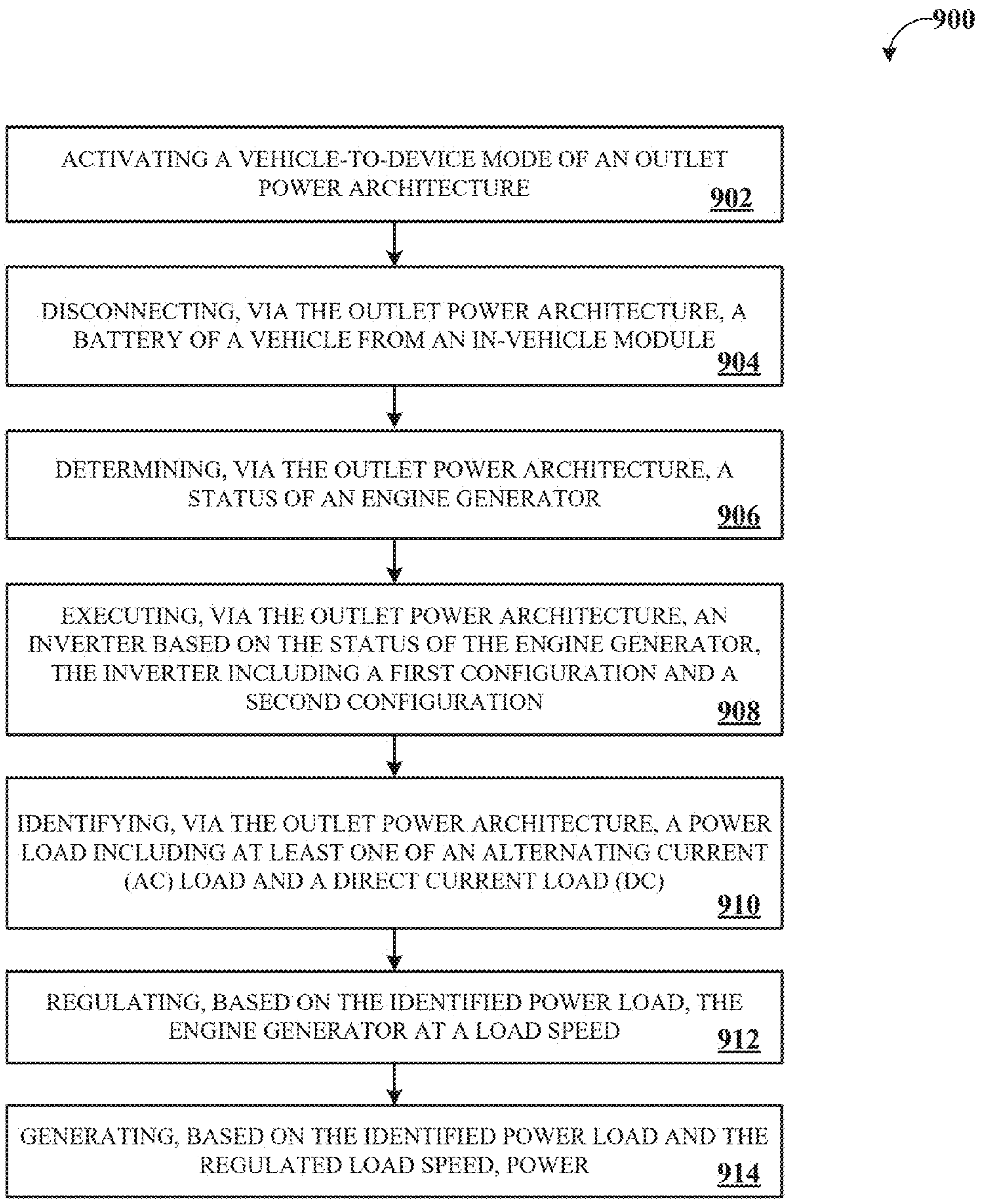
FIG. 9 is another exemplary flow diagram for a method of executing an outlet power architecture according to the present disclosure.

FIG. 9 illustrates an example method 900 of operating an outlet power system 10. At 902, the outlet power system 10 activates a vehicle-to-device mode 16*b* of an outlet power architecture 12. The outlet power architecture 12 disconnects, at 904, a battery 104 of the vehicle 100 from an in-vehicle module 16. At 906, the outlet power architecture 12 determines a status of an engine generator 102. The outlet power architecture 12 executes, at 908, an inverter 22 based on the status of the engine generator 102, the inverter 22 including a first configuration 22*a* and a second configuration 22*b*. The outlet power architecture 12 identifies, at 910, a power load 14 including at least one of an alternating current (AC) load 14*a* and a direct current (DC) load 14*b*. At 912, the outlet power architecture 12 regulates, based on the identified power load 14, the engine generator 102 at a load speed 102*b*. Based on the identified power load 14 and the regulated load speed 102*b*, the outlet power architecture 12 generates, at 914, power 38.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An outlet power architecture for a vehicle, the outlet power architecture comprising:
- a power source including a power load including a direct current (DC) load;
- a direct current to alternating current (DC-AC) converter coupled to the power source, the DC-AC converter including a plurality of switches and a first capacitor and a second capacitor operably coupled to the plurality of switches;
- a DC to DC (DC-DC) converter coupled to the power source; and
- a power outlet operably coupled to the DC-AC converter, the power outlet configured to execute at least one of a first DC power conversion, a second DC power conversion, and a third DC power conversion, the first DC power conversion including a direct DC output, the second DC power conversion including a shared DC output, and the third DC power conversion including the DC-DC converter.

2. The outlet power architecture of claim 1, further including an AC filter operably coupled to the DC-AC converter and the power outlet.

3. The outlet power architecture of claim 1, further including a balance circuit operably coupled to each of the first capacitor and the second capacitor of the DC-AC converter.

4. The outlet power architecture of claim 1, wherein the power outlet includes a three-phase architecture.

5. The outlet power architecture of claim 1, wherein the power source is an engine generator.

6. The outlet power architecture of claim 1, wherein the power source is a fuel cell.

7. A hybrid vehicle equipped with the outlet power architecture of claim 1.

8. An outlet power architecture for a vehicle, the outlet power architecture comprising:
- an engine generator;
- an inverter coupled to the engine generator;
- a converter coupled to the engine generator via the inverter, the converter including a plurality of switches, at least one capacitor operably coupled to the plurality of switches, and a direct current to direct current (DC-DC) converter; and
- a power outlet operably coupled to one of the converter and the inverter, the power outlet configured to identify a DC load and generate at least one of a first DC power conversion, a second DC power conversion, and a third DC power conversion, the first DC power conversion including a DC output from one of the converter and the inverter, the second DC power conversion including a shared DC output, and the third DC power conversion including the DC-DC converter.

9. The outlet power architecture of claim 8, further including an AC filter, the converter including a DC-AC converter and the AC filter operably coupled to the DC-AC converter and the power outlet.

10. The outlet power architecture of claim 8, further including a balance circuit, the converter including a first capacitor and a second capacitor and the balance circuit operably coupled to each of the first capacitor and the second capacitor of the converter.

11. The outlet power architecture of claim 8, wherein the converter is includes a direct current to alternating current (DC-AC) converter.

12. A hybrid vehicle equipped with the outlet power architecture of claim 8.

13. A method of generating power using an outlet power architecture for a hybrid vehicle, the method including:
- activating a vehicle to device mode of the outlet power architecture;
- disconnecting, via the outlet power architecture, a battery of a vehicle from an in-vehicle module;
- determining, via the outlet power architecture, a status of an engine generator;

executing, via the outlet power architecture, an inverter based on the status of the engine generator, the inverter including a first configuration and a second configuration;

identifying, via the outlet power architecture, a power load including at least one of an alternating current (AC) load and a direct current (DC) load;

identifying, if present, the DC load;

executing at least one of a first DC power conversion, a second DC power conversion, and a third DC power conversion, the first DC power conversion including a direct DC output, the second DC power conversion including a shared DC output, and the third DC power conversion including a DC to DC (DC-DC) converter;

regulating, based on the identified power load, the engine generator at a load speed; and generating, based on the identified power load and the regulated load speed, power.

14. The method of claim 13, wherein determining an active status of the engine generator includes pre-charging a DC bus and identifying a load speed based on a voltage of the DC bus.

15. The method of claim 13, wherein the first configuration of the inverter includes a passive diode rectifier and the second configuration of the inverter includes active switching of a synchronous rectifier.

16. The method of claim 13, wherein identifying the power load includes identifying the AC load and executing AC power conversion using a phase inverter.

17. The method of claim 13, further including selectively activating switches to define one of the DC load and the AC load at a common outlet.

18. The outlet power architecture of claim 8, wherein at least one of an upper switch and a lower switch of the plurality of switches is closed to define a path for the DC load.

19. The method of claim 17, further including closing one of an upper switch and a lower switch of the switches to define a path for the DC load.

20. The method of claim 13, further including neutralizing an AC filter and executing a DC-AC converter.

* * * * *